Sept. 8, 1936.　　　F. T. EISENMANN　　　2,053,520
APPARATUS FOR EFFECTING QUICK FREEZING
Filed Jan. 2, 1932　　　2 Sheets-Sheet 1
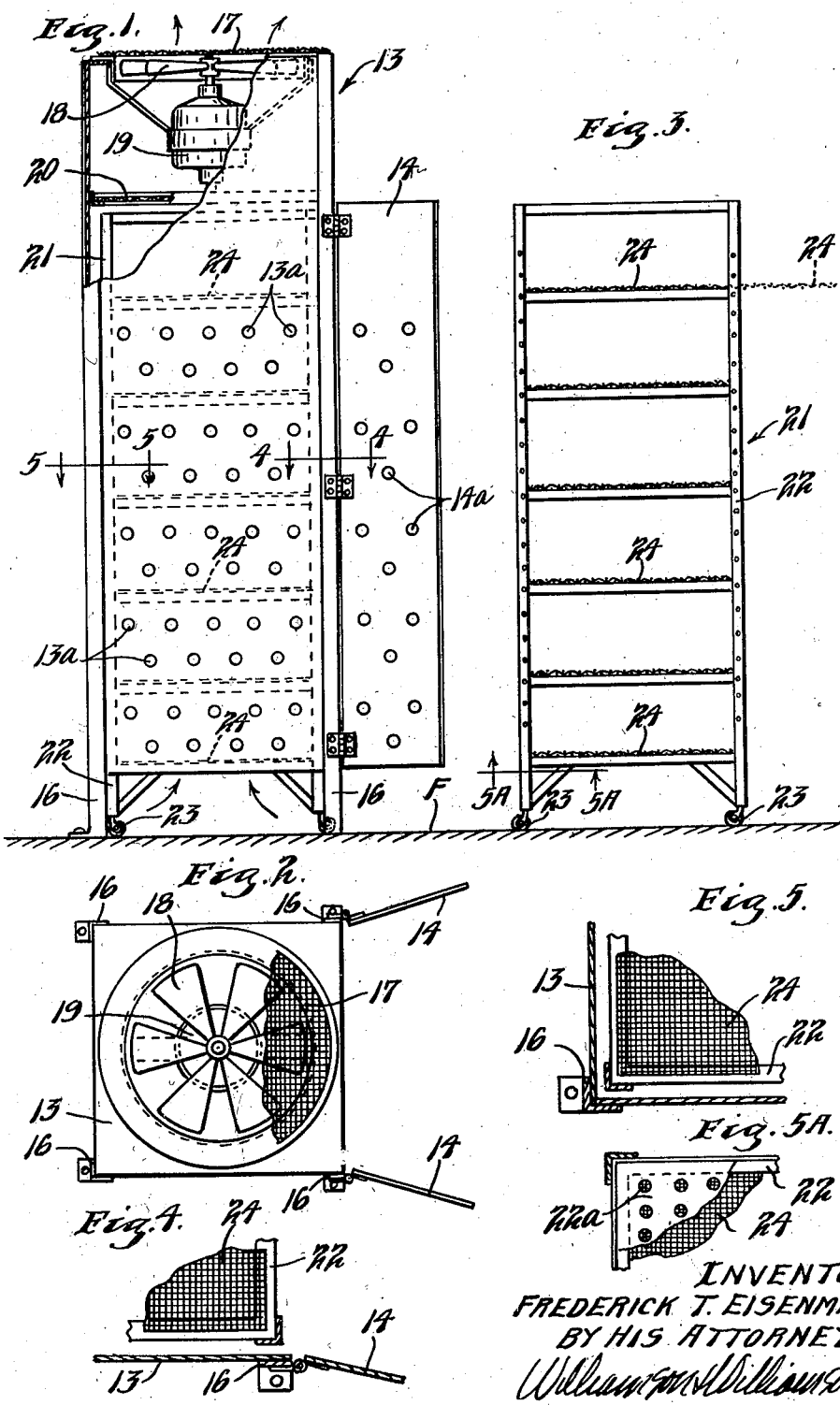

Sept. 8, 1936.   F. T. EISENMANN   2,053,520
APPARATUS FOR EFFECTING QUICK FREEZING
Filed Jan. 2, 1932   2 Sheets-Sheet 2
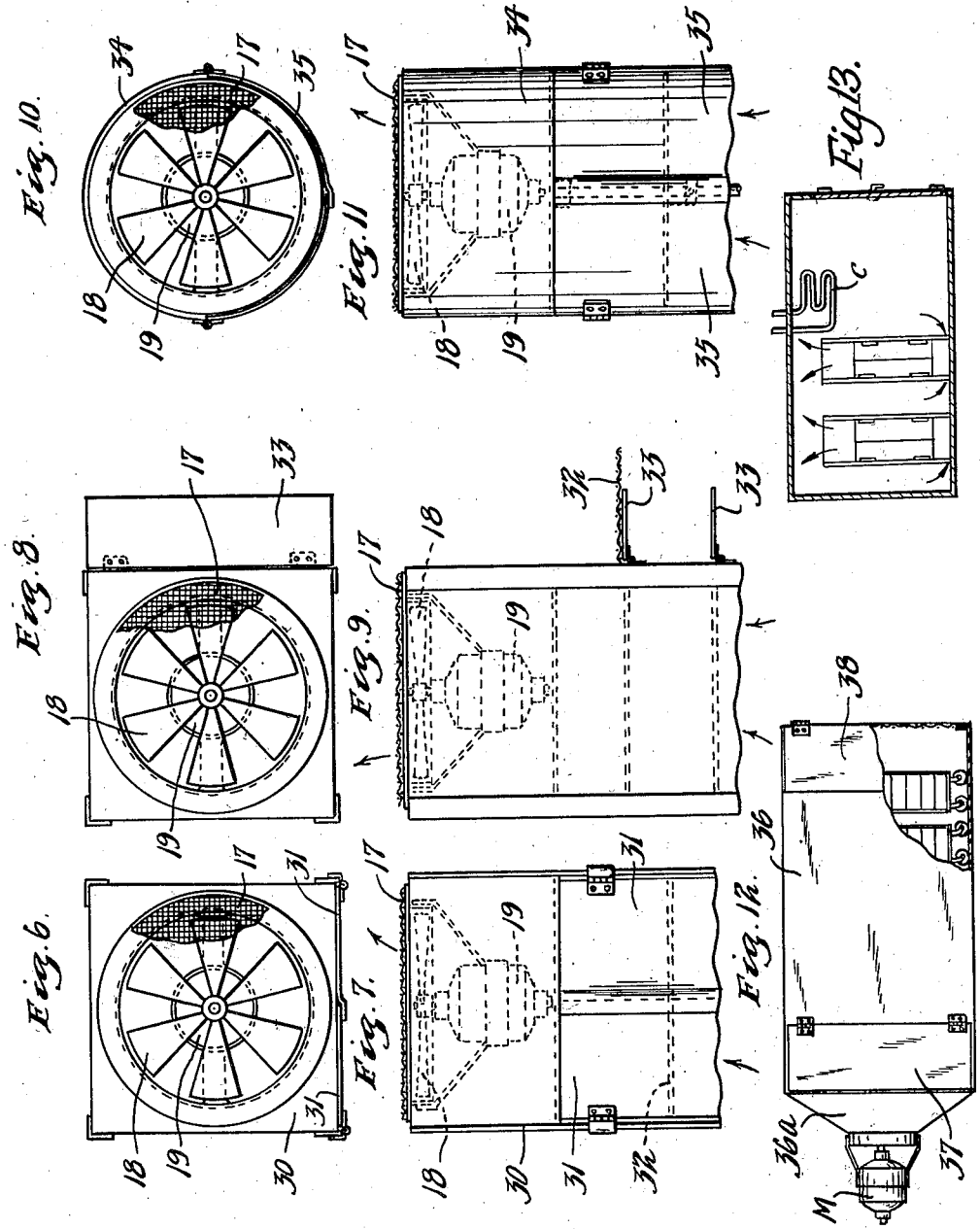
INVENTOR.
FREDERICK T. EISENMANN.
BY HIS ATTORNEYS.
Williamson & Williamson Patented Sept. 8, 1936

2,053,520

UNITED STATES PATENT OFFICE 2,053,520

APPARATUS FOR EFFECTING QUICK FREEZING

Frederick T. Eisenmann, Milwaukee, Wis., assignor to The King Company, Owatonna, Minn., a corporation of Minnesota Application January 2, 1932, Serial No. 584,447

3 Claims. (Cl. 62—102)

My invention relates to a method and apparatus for effecting sharp, quick and fast freezing of food and other materials wherein the use of controlled and directed cold air currents are employed.

The present methods of freezing foods either are very slow or require extremely low temperatures, and in the latter case contamination of the food often occurs in that food is usually packed in cans or other containers and is submerged or covered with liquid refrigerant.

Sharp or fast freezing of foods has been found to have many advantages over slow freezing. With fast freezing the crystals formed are relatively small and compact and they are easily contained by the elastic cell walls of the food, while with slow freezing large crystals are formed, often rupturing the tissues and cell membranes and causing the juices of the food to escape when the food is thawed, thus resulting in impairment of the flavor of the food. The texture and flavor of the food are greatly improved by fast freezing. For example, with ice cream, the texture is smoother, more velvety and this physical difference produces a more delectable taste. With rapid freezing the output of a freezing or hardening room can be greatly increased or, stated in another way, a much smaller freezing room is required for a given output.

It is an object of my invention to provide an improved method and improved apparatus for very rapidly and economically freezing foods and other materials of various kinds without requiring the employment of extremely low temperatures.

A further object is to provide a method and apparatus of the class described wherein controlled and directed currents of cold air are employed, as contrasted with methods which bring the food or its containers into contact with liquid refrigerants.

Another object is to provide a method and apparatus which may be economically carried out and installed in existing freezing, hardening or cold storage rooms and wherein the cold air at low temperatures in said rooms is rapidly and continuously circulated, controlled and directed against the surfaces of the materials to be treated, thereby obtaining maximum speed in heat absorption and materially reducing the time required to obtain the desired hardness of the material.

It is a further object to provide simple and compact apparatus which may be economically constructed and installed in a freezing or cold storage room and which will cooperate with the refrigerating units within the room to rapidly circulate, direct and distribute cold air through a compact enclosure wherein the material to be treated is contained.

These and other objects and advantages of the invention will be more fully set forth in the following description made in connection with the accompanying drawings, in which like reference characters refer to similar parts throughout the several views, and in which:—

Fig. 1 is a side elevation of my invention, partially broken away to show a section of the interior;

Fig. 2 is a top plan view partially broken away;

Fig. 3 is a side elevation of the portable tray rack;

Fig. 4 is a horizontal section showing details of a part of the cabinet and tray rack;

Fig. 5 is a horizontal section showing details of a part of the cabinet and tray rack;

Fig. 5A is a cross section taken on the line 5A—5A of Fig. 3 looking in the direction of the arrows and showing the construction of the reticulated bottom for the portable tray rack;

Figs. 6 and 7 show respectively a top view and partial elevation of another form of my invention;

Figs. 8 and 9 show respectively a top view and partial elevation of still another form of my invention;

Figs. 10 and 11 show respectively a top view and partial elevation of another form of my invention, and Fig. 12 is a side elevation of still another form of my invention.

Fig. 13 is a diagrammatical view illustrating the use of my improved apparatus in association with a refrigerating chamber.

Referring to the form of the invention shown in Figs. 1 to 5A inclusive, a cabinet 13 is provided of rectangular cross section. The back and two sides of the cabinet 13 are in the form of panels made of sheet metal or other suitable material and may be provided with a multiplicity of air intake openings or passages 13a. Said passages are spaced apart and may vary in size or diameter from the lower end of the cabinet to the upper portion, as may be found most advantageous for producing a uniform entrance of air laterally into the cabinet. The front is provided with a pair of hinged doors 14 made of similar material and said doors may be also provided with apertures or air intake passages 14a arranged substantially similar to the passages formed in the panels of the cabinet. The bottom of the cabinet is open and is spaced from the floor or supporting surface F by means of extended portions or legs 16 of the longitudinal corner members of the frame of the cabinet 13. The top of the cabinet is open except for a wire netting or screen panel 17. Immediately below the wire netting panel 17 is mounted a suitable fan 18 disposed and constructed in such a manner as to draw air from the interior of the cabinet 13 upwardly and out of the cabinet 13 through the wire netting panel 17. Fan 18 is driven by an electric motor 19 suspended in the upper portion of cabinet 13. Below the fan motor 19 is located a horizontally disposed wire netting partition 20. The elevation of the wire netting partition 20 is just above the elevation of the tops of the hinged doors 14.

In Fig. 3 is shown a portable tray rack 21, adapted in physical dimensions to be compactly placed inside of the cabinet 13. The tray rack 21 consists of an open rectangular framework 22 mounted on wheels or castors 23. Inside of the framework 22 are mounted a plurality of spaced wire netting shelves 24. Below the lower netting shelf 24 and suitably secured to the cross pieces defining rack 21 is a reticulated bottom 22a which may be in the form, as shown in Fig. 5A, of a plate provided with a multiplicity of perforations or air intake apertures.

The cabinet is placed in a freezing, "hardening" or cold storage room as illustrated in Fig. 13 in which the air is maintained at a suitably low temperature by means, such as refrigerating coil C. The food to be frozen is placed on the shelves 24 of the portable tray rack 21 and transported by the rack to the cabinet. The portable tray rack 21 is placed inside of the cabinet 13 and the hinged doors 14 of the cabinet 13 are closed. The electrically driven fan 18 is in operation continuously while the cabinet is in use. Since the air surrounding the food to be frozen is maintained at a temperature lower than that of the food, a transfer of heat from the food to the surrounding air will take place. If the air surrounding the food were stationary or only moving very slowly, the air immediately surrounding the food would rise in temperature due to the transfer of heat from the food to the air. The rise in temperature of the air immediately adjacent the food would result in a decrease in the temperature gradient between the food and the adjacent air and hence would greatly decrease the transfer of heat from the food to the air with the result that the freezing process would be quite slow. In my invention the air in the cabinet is continuously being removed by the fan 18 and replaced by cold air. Hence the food is always surrounded by cold air. The result is that the greatest possible temperature gradient between the food and the surrounding air is always maintained, and hence the transfer of heat from the food to the surrounding air, and consequently the freezing of the food, is very rapid. It is obvious that the temperature of the freezing room need not be extremely low to obtain very rapid freezing. For quickly freezing ice cream and other food products, temperatures varying from —5 degrees to —20 degrees have been found satisfactory and at a temperature of —15 degrees ice cream in half pint containers is solidified and in prime condition at the end of one and one-half hours with the employment of my method and apparatus, while quart containers of ice cream will be likewise hardened in a period of approximately 3 hours.

It will further be noticed that due to the somewhat restricted and perforated bottom 22a air will be drawn into the cabinet laterally of the vertical walls or panels through apertures 13a and 14a and will pass substantially horizontally over the food or food containers disposed upon the shelves 24. The main current of air will of course travel upwardly through the cabinet and with the structure described a substantially uniform direction and distribution of cold air is effected.

In addition to the efficiency and economy effected by the use of my method and apparatus, it will be readily seen that the method is much safer for employees or attendants than methods requiring extremely low temperatures because of the less danger of frost biting parts of the human body which are exposed in the freezing room.

In Figs. 6 and 7 a somewhat different form of the invention is illustrated, similar in most respects to the apparatus previously described. The second form comprises a vertical cabinet 30 having the fan 18 mounted in the upper end thereof and adapted to draw air vertically through the cabinet. The cabinet is provided with hinged doors 31 at one of its sides and removable shelves preferably constructed of reticulated material, such as netting are mounted on suitable guides provided by the cabinet itself.

The form of the invention shown in Figs. 8 and 9 is substantially similar to the form shown in Figs. 6 and 7 with the exception, however, that individual doors 33 are provided for rendering each shelf 32 accessible. Doors 33 are hinged to one side of the cabinet on horizontal axes and means are provided for holding doors 33 horizontally when outwardly opened whereby the shelves 32 may be supported thereon.

The form of the invention shown in Figs. 10 and 11 is similar to that shown in Figs. 6 and 7 with the exception that the cabinet 34 is in the form of a cylindrical casing having the doors 35 of arcuate horizontal cross section.

In Fig. 12 is illustrated a relatively large cabinet having special adaptability for use in large refrigerating rooms and comprising a large box shaped housing 36 provided with an exit door 37 adjacent one end thereof and an entrance door 38 adjacent the opposite end thereof. Doors 37 and 38 as shown are formed in one of the side vertical walls of housing 36. The forward end 36a of the housing is reduced by tapering and a large fan, not shown, is mounted therein, driven by motor M. With the form of the invention shown the portable tray racks 21 illustrated in Fig. 3 may be successfully utilized to convey materials from a treating apparatus, such as a mixing device to the quick freezing housing 36. A number of the tray racks 21 are utilized and the racks are successively wheeled into the housing through entrance door 38 and progressed forwardly and removed through the exit door 37 after treatment for a predetermined period.

I also contemplate, with a large housing or cabinet, such as the cabinet 36, the use of a progressively moved conveyor to successively receive materials to be quickly frozen and to deliver them after rapid freezing from the forward end of the housing. Various means may be provided in all of the forms shown, if desired, for continuously moving and changing the positions of the materials to be frozen within the cabinet or housing as the materials are treated with the directed currents of cold air.

From the foregoing description it will be seen that I have invented a simple and highly efficient method for very rapidly or sharply freezing products at comparatively little expense. It will further be seen that I have provided novel, comparatively inexpensive and highly efficient apparatus for carrying out my method or process which is especially well adapted to be associated with cold storage or refrigeration rooms now extensively used and which will effect a marked economy in solidifying and freezing food products and other materials in that the temperatures of the hardening or refrigeration room may be considerably higher, requiring less expensive refrigerating means than those extensively utilized at the present time and in that the capacity of a refrigerating room is tremendously increased due to the very short time required for thoroughly freezing the materials.

Further economy is effected by the use of my process and apparatus in cold weather inasmuch as natural air may be obtained from the outside and drawn into the room and circulated by the fan or other circulating medium employed in my apparatus.

It will, of course, be understood that various changes may be made in the form, details, proportions and arrangement of the parts of the apparatus and that my method may be carried out by either projecting or drawing air through the confining casing or enclosure without departing from the scope of my invention, which generally stated, consists in a device capable of carrying out the objects above set forth and in the novel parts and combinations of parts, as well as in the novel steps and combinations of steps disclosed and defined in the appended claims.

What is claimed is:—

1. In combination with a refrigeration chamber, a casing mounted in said chamber and surrounded by the cold air therein, said casing having an air discharge at one end thereof, having air intake passages at the opposite end thereof and having additional laterally disposed air intake passages in the side walls thereof, article supporting means within said casing and a fan adjacent the air discharge of said casing adapted to draw air into said casing through said several air intake passages.

2. In combination with a refrigeration chamber filled with cold air, a casing mounted in said chamber and surrounded by the cold air therein, said casing having an air intake passage at one end thereof and an air discharge passage at the opposite end thereof, article-supporting means traversing the length of said casing and a fan associated with said casing and adapted to set up a very rapid forced circulation of cold air drawn from said chamber and directed longitudinally through said casing over the surfaces of material disposed on said article-support.

3. Fast freezing apparatus for use in a refrigerating chamber which is filled with cold air comprising a vertical casing having a substantially open lower end and an upper end provided with air passages, doors at one side of said casing affording an unobstructed passage into said casing from the floor or support for said casing to a point adjacent the upper end of said casing, a vertical truck adapted to fit within said casing and to be moved into said casing across the floor or supporting surface when said doors are open, said truck having a series of horizontal article-supports and a fan associated with said casing for setting up a rapid forced circulation of cold air taken from said chamber and directed longitudinally through said casing.

FREDERICK T. EISENMANN.